United States Patent
Cappuccilli et al.

(10) Patent No.: US 12,158,578 B2
(45) Date of Patent: Dec. 3, 2024

(54) VEHICLE GLAZING AND DISPLAY SYSTEM

(71) Applicant: SAINT-GOBAIN GLASS FRANCE, Courbevoie (FR)

(72) Inventors: Michele Cappuccilli, Monschau (DE); Johannes Wolf, Aachen (DE); Patrick Gayout, Villemomble (FR); Cecile Ozanam, Palaiseau (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 620 days.

(21) Appl. No.: 17/420,944

(22) PCT Filed: Dec. 13, 2019

(86) PCT No.: PCT/EP2019/085124
§ 371 (c)(1),
(2) Date: Jul. 6, 2021

(87) PCT Pub. No.: WO2020/143996
PCT Pub. Date: Jul. 16, 2020

(65) Prior Publication Data
US 2022/0091414 A1    Mar. 24, 2022

(30) Foreign Application Priority Data
Jan. 7, 2019 (EP) .................................. 19150532

(51) Int. Cl.
*G02B 27/01* (2006.01)
*B60J 1/00* (2006.01)
(Continued)

(52) U.S. Cl.
CPC .......... *G02B 27/0101* (2013.01); *B60J 1/001* (2013.01); *B60K 35/00* (2013.01); *G02B 5/0242* (2013.01); *B60K 35/23* (2024.01)

(58) Field of Classification Search
CPC ... G02B 27/01–0189; G02B 2027/0105–0198; G02B 5/00–32;
(Continued)

(56) References Cited

U.S. PATENT DOCUMENTS

| | | |
|---|---|---|
| 7,157,133 B2 | 1/2007 | Moran |
| 7,230,767 B2 | 6/2007 | Walck et al. |

(Continued)

FOREIGN PATENT DOCUMENTS

| | | |
|---|---|---|
| CN | 106462047 A | 2/2017 |
| CN | 108368348 A | 8/2018 |

(Continued)

OTHER PUBLICATIONS

International Search Report as issued in International Patent Application No. PCT/EP2019/085124, dated Mar. 12, 2020.

*Primary Examiner* — Bao-Luan Q Le
*Assistant Examiner* — Christopher A Lamb, II
(74) *Attorney, Agent, or Firm* — Pillsbury Winthrop Shaw Pittman LLP

(57) ABSTRACT

A vehicle glazing and display system includes a vehicle compound glazing unit including a layer or surface which diffusely reflects incident light directed to the glazing unit from the interior of the vehicle and having a maximum gain in the range of 0.1 to 0.8 and a viewing angle for a real image element generated within the glazing plane of more than 60°, in a first direction and of more than 30°, in a second direction, perpendicular to the first direction, and a projector for projecting an image to the vehicle glazing unit to generate a real image in the plane of the glazing unit and wherein the vehicle compound glazing unit is a windshield.

21 Claims, 5 Drawing Sheets

Figure 1:
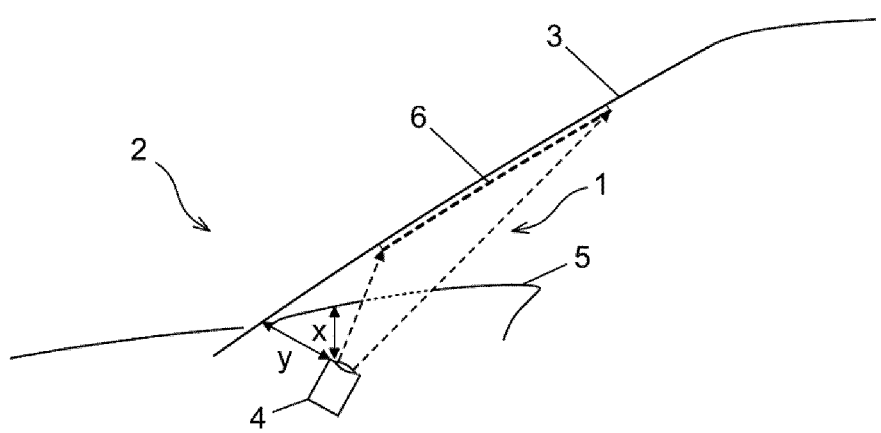

(51) Int. Cl.
B60K 35/00 (2024.01)
B60K 35/23 (2024.01)
G02B 5/02 (2006.01)

(58) Field of Classification Search
CPC ..... B60K 2370/00–98; B60K 35/00–90; B60J 1/00–2097
See application file for complete search history.

(56) References Cited

U.S. PATENT DOCUMENTS

| | | | |
|---|---|---|---|
| 8,519,362 B2 | 8/2013 | Labrot et al. | |
| 2015/0138627 A1* | 5/2015 | Ehrensperger | G03B 21/60 |
| | | | 359/443 |
| 2018/0279454 A1* | 9/2018 | Takeshita | F21V 3/049 |
| 2018/0348411 A1* | 12/2018 | Yamaki | G02B 5/0278 |
| 2018/0371262 A1* | 12/2018 | Aihemaiti | C09D 7/65 |
| 2020/0353816 A1* | 11/2020 | Hirata | G06V 20/59 |
| 2021/0271096 A1* | 9/2021 | Kim | B32B 3/30 |

FOREIGN PATENT DOCUMENTS

| | | |
|---|---|---|
| EP | 2 185 966 A2 | 5/2010 |
| EP | 2 670 594 A1 | 12/2013 |
| EP | 2 856 256 A1 | 4/2015 |
| EP | 2 856 533 A1 | 4/2015 |
| EP | 2 872 328 A1 | 5/2015 |
| EP | 2 883 693 A1 | 6/2015 |
| EP | 3 063 002 A1 | 9/2016 |
| EP | 3 151 062 A1 | 4/2017 |
| EP | 3 395 908 A1 | 10/2018 |
| JP | 2016-009271 A | 1/2016 |
| WO | WO 2009/035783 A2 | 3/2009 |
| WO | WO 2012/104547 A1 | 8/2012 |
| WO | WO 2013/175129 A1 | 11/2013 |
| WO | WO 2013/175130 A1 | 11/2013 |
| WO | WO 2014/009663 A1 | 1/2014 |
| WO | WO 2015/063418 A1 | 5/2015 |
| WO | WO 2016/175183 A1 | 11/2016 |
| WO | WO 2017/204103 A1 | 11/2017 |
| WO | WO 2018/015702 A1 | 1/2018 |

* cited by examiner

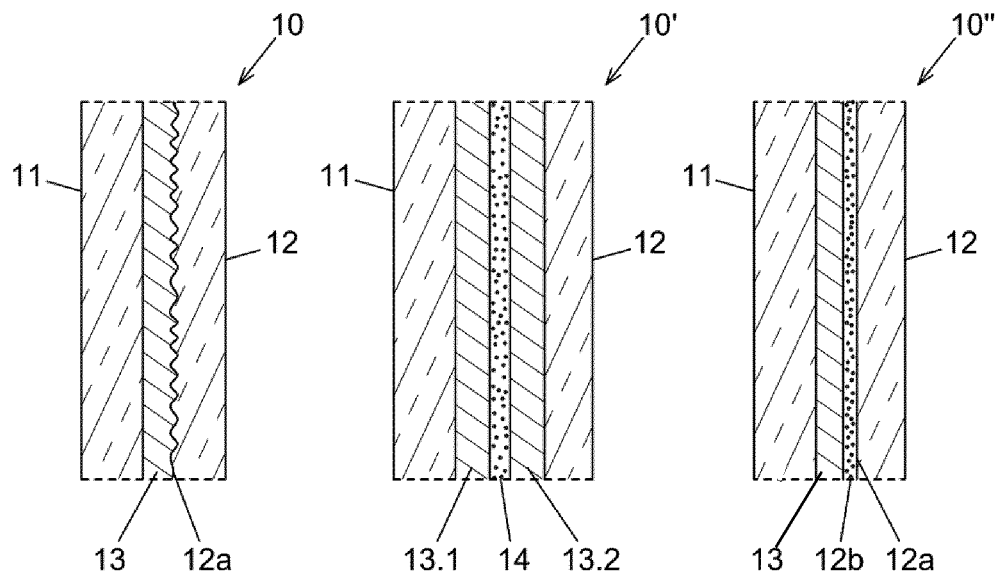
Fig. 4A  Fig. 4B  Fig. 4C
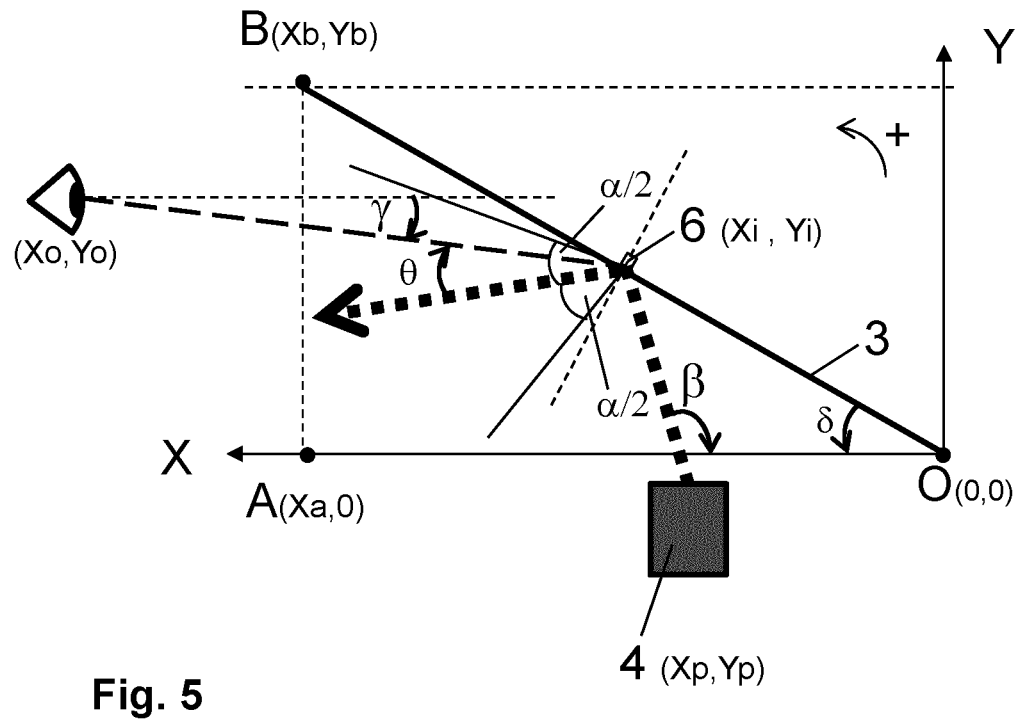
Fig. 5

VEHICLE GLAZING AND DISPLAY SYSTEM

CROSS-REFERENCE TO RELATED APPLICATIONS

This application is the U.S. National Stage of PCT/EP2019/085124, filed Dec. 13, 2019, which in turn claims priority to European patent application number 19150532.0 filed Jan. 7, 2019. The content of these applications are incorporated herein by reference in their entireties.

FIELD OF THE INVENTION

The invention is in the field of displaying information on a glazing element of a vehicle. More specifically, the invention is in the automotive field, but it is not restricted to this field but can be implemented in buses, railway cars, boats, airplanes or other vehicles. More specifically, the invention is related to a vehicle glazing and display system, comprising a vehicle compound glazing unit and a projector for projecting an image to the glazing unit.

BACKGROUND/PRIOR ART

In this technical field, there are many patents or patent applications which are, to a certain extent, background art to the present invention.

U.S. Pat. No. 7,157,133 discloses the basic concept of diffuse reflection with embedded diffusing surface.

EP 2 185 966 discloses an element with a diffusing surface on which a reflective layer is deposited, the whole being in an envelope of the same refractive index as the diffusing element. The assembly is designated as a numerical aperture expander working in reflection, which seems functionally close to a diffuser and a transparent element in transmission. In this patent, the integration of such an element in a head-up display (HUD) projection system for generating virtual images is mentioned.

U.S. Pat. No. 8,519,362 B2 to Saint-Gobain describes an HUD system assembled into a car. It is based on a laminated windshield where the HUD function comes from a layer of luminophore material. U.S. Pat. No. 7,230,767 B2 describes a display system in a car glass pane using a light emitting material projecting the image to the driver. The image is a virtual image, focused meters away from the eyes of the driver and from the windshield.

A preparation process of an HUD system integrated into a laminated glass pane is described in the Saint-Gobain owned patent EP 2 883 693.

Regarding the general concept of transparent glazing units which have a certain degree of diffuse reflection, there are several patent publications of Saint-Gobain, e.g. EP 2 670 594, EP 2 856 256, EP 2 856 533, EP 2 872 328, EP 3 063 002, WO 2018 015 702, and FR 3 054 17. In these patent documents, it is, inter alia, disclosed that such diffusely reflective glazing can contain a rough internal surface and a coating provided thereon and that such glazing can be used for OLED display solutions or for projection-based display solutions.

EP 3 395 908 A1 discloses a transmission type screen as head-up-display for automotive applications, in which the screen is particle based.

In EP 3 151 062 A1 a video projection structure for integration into an automotive window is presented, wherein the window contains a reflection film applied on a surface having random irregularities.

JP 2016 9271 A discloses a video display system, which is equipped with detection means to detect a movement of the observer, wherein display system can be operated by the movement of the observer.

It is an object of the present invention, to provide a vehicle glazing and display system and corresponding vehicle compound glazing unit, which are adapted for a broad range of applications in future mobility solutions. More specifically, it is an object to provide a system which makes it possible to display rich content to basically all persons which use a vehicle or at least to all those persons, which sit close to a respective glazing unit. Furthermore, a solution is required which can be implemented, to a far extent, on the basis of available technologies and which is safe, reliable and cost-efficient.

These, and further, objects are solved by a vehicle glazing and display system according to claim 1 and, as a crucial component thereof, by a vehicle compound glazing unit according to claim 8. Preferred embodiments of the invention are subject of the respective dependent claims.

The vehicle glazing and display system according to the invention comprise a vehicle compound glazing unit comprising a layer or surface which diffusely reflects incident light directed to the glazing unit from the interior of the vehicle and a projector for projecting an image to the vehicle glazing unit to generate a real image in the plane of the glazing unit. The vehicle glazing with display system shows a maximum gain (also referred to as peak gain) in the range of 0.1 to 0.8, preferably between 0.3 and 0.6. The intrinsic viewing angle $\alpha$ for a real image element generated within the plane of glazing is larger than 40°, preferably larger than 60° and more preferably larger than 70° or more in a first direction and larger than 20°, preferably larger than 30° in a second direction, which is perpendicular to the first direction. When using these intrinsic viewing angles within practical application at standard environment conditions, a practical viewing angle of larger than 60°, preferably larger than 90° and more preferably larger than 120° or more in a first direction and larger than 30°, preferably larger than 45° in a second direction, which is perpendicular to the first direction, can be achieved. The practical viewing angle is dependent of both the luminous environment and the used projector. Nevertheless, the practical viewing angle is a commonly used feature for screen specification and can be determined for chosen environment conditions related to a particular use case. For standard environmental conditions and projector specification the following values could be used:

External illuminance 2200 Lux (outside the car); internal illuminance 100 Lux (inside the car); flux from projector 3500 Lumen; Projection surface: 16:9 screen with 9" diagonal (20 cm width); the practical view angle can then be extracted from gain curve via a mathematical formula.

The practical viewing angle is studied on the basis of the contrast of the screen. The contrast of a screen is commonly defined as the luminance ratio between a white and a black picture, wherein a minimum ratio of 4.5:1 (white picture to black picture) is considered as necessary for information reading. Based on this, the practical viewing angle can be derived as the observation angle $\theta$ within the position where at least the minimum contrast of 4.5:1 is achieved.

The intrinsic viewing angle $\alpha$ of a projection screen is measured at the full width half maximum (FWHM) of the peak around the maximum value of the gain, independent of the value of the observation angle $\theta$ at the peak center. The $\theta=0°$ reference for the gain curve measurement corresponds to the specular reflection direction. Thus, the intrinsic viewing angle α is a property of the screen and not dependent on environmental luminance and projector specification. Thus, as the maximum of the gain curve often occurs at θ=0°, the intrinsic view angle can also be defined in this case as twice the observation angle θ at the position of the gain curve where the half maximum width of the gain curve is achieved.

The viewing angle (intrinsic and practical) shall be maximized as large viewing angles are necessary to ensure that all passengers of a vehicle can clearly see the projected content at the same time independent of the seat occupied by a person. However, with a given screen total reflectivity, a compromise between a high peak gain and a large viewing angle has to be found. The vehicle glazing according to the invention provides such a good compromise between peak gain and viewing angle.

In a preferred embodiment of the invention, the transparent screen of the vehicle glazing has a maximum gain between 0.1 and 0.8 and a practical viewing angle superior to 60° in one direction and larger than 30° in the other one. Typically, for the practical viewing angle values between 120° to 150° in horizontal plane and between 30 and 180° in vertical plane are derived. Within the intrinsic angle definition an intrinsic viewing angle superior to 40°, more preferably superior to 60°, even more preferably between 70° and 150°, in horizontal plane and between 20° and 180°, preferably between 30° and 180°, in vertical plane is derived. Vertical plane and horizontal plane are defined within the assembly situation of the vehicle glazing within the car body.

Thanks to the mentioned practical and intrinsic viewing angles, all the occupants in the vehicle can see the display when the projector is on. According to a further aspect of the invention, the displayed image is a real image. A real image differs from a virtual image concerning the plane of focus. For virtual images the plane of focus has a certain distance to the projection screen, e.g. one meter or up to several meters. In contrast to this for real images the plane of focus is near to the screen. Preferably the plane of focus for a real image according to the invention has a maximum distance of 30 cm to the projection screen (for example a windshield).

When the projector is off, the glazing is optically similar to a traditional glazing, maintaining transparency with a slightly higher haze value. A typical haze value for such a glazing is between 1% and 6%, preferably between 2.5% and 4.5% measured according to the standard ASTM D 1003. The haze measures the fraction of transmitted light that is deviated from the straight path with an angle larger than 2.5°. High haze values correspond to a loss of contrast of the image projected on the screen. Within the given range of low haze values a good transparency of the screen is obtained.

According to a further preferred aspect, the reflective layer or surface within the glazing unit has a transmission of visible light of higher than 60%, preferably of 70% or more, for example 80% or more. These transmission values (also referred to as global luminous transmission TO quantify the ability of the reflective layer or surface to transmit light of wavelength between 400 nm to 800 nm, which is the range of the spectrum visible to human eye. For those measurements no distinction between diffused light and non-diffused light has to be made. The mentioned transmission values have the advantage that the reflective layer or surface can be used within vehicle windshields for which a high light transmission of at least 70% of visible light has to be guaranteed. Nevertheless, the technology according to the invention is also applicable to glazing in which a lower light transmission is desired. The screen ensemble of the invention could for example also be used in glass roofs for vehicles, which usually comprise tinted glass or plastic components and have an overall transmission of visible light below 30%. Such an application is of particular interest in combination with autonomous driving technology. In this case the roof could for example be used as entertainment screen.

To measure the gain and determine suitable viewing angles of a transparent screen, one has to measure the luminance of the screen as a function of the observation angle with a projector illuminating the screen with a normal incidence (0°). The luminance of an ideal screen (Lambertian reference called Spectralon) is measured under the same conditions. An ideal screen is defined as a screen whose luminance does not depend on the projection or observation angle and whose reflectivity is 100%. The Lambertian reference screen is a surface perfectly obeying Lambert's cosine law saying that the luminous intensity observed from an ideal diffusely reflecting surface is directly proportional to the cosine of the angle between the direction of the incident light and the surface normal. The human eye can only recognize the luminance, which is a measure of luminous intensity per unit area of light travelling in a given direction, and describes the amount of light that is reflected from a particular area. Thus, a Lambertian surface with ideal diffuse reflection is seen by the human eye as showing the same luminance and brightness independent of the observation angle from which it is viewed. Experimentally an ideal Lambertian diffuser is accessible by commercially available reference materials known as "Spectralon", which is made of sintered polytetrafluoroethylene (PTFE). To retrieve the gain of the screen at each observation angle, the ratio between the screen luminance and the ideal screen luminance is calculated. The peak gain of the screen is the maximum gain value reachable for the screen. The maximum gain (also referred to as peak gain) is often measured at 0° but some specifically designed screen may have their maximum gain at other observation angle. It is to be noted that for a transparent screen, the value at 0° may not be measureable because of the hotspot (specular reflection of projector light on the external flat glazing surface) and is therefore extrapolated from gain at small angle.

Figure 2:
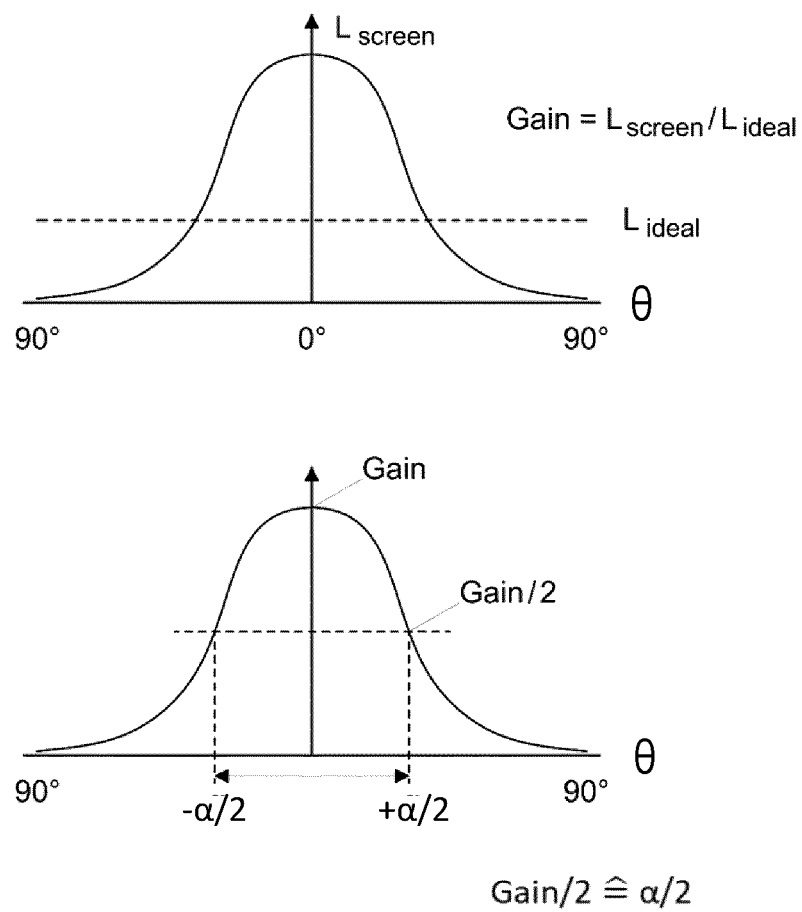

Preferred intrinsic viewing angles are defined from the gain as being within the full width half maximum of the gain curve (see FIG. 2). This definition is an intrinsic one. The gain denotes the luminance of the projection screen relative to the luminance of an ideal screen, which is a perfect Lambertian diffuser.

An alternative, more practical, definition of the viewing angle would be to define a practical viewing angle as the observation angle where the contrast is lower than 4.5:1, but such definition depends on observation and illumination conditions and projector. Thus, the intrinsic definition of viewing angles, being within the full width half maximum of the gain curve, is preferred. The gain curve can be determined as already described and has for example the shape of a Gaussian curve.

The inventors detected that that not only observation angles inferior to the half of the intrinsic view angle (i.e. within the full width half maximum of the gain curve) are suitable for practical application of the transparent screens. Adequate observation results can be achieved under observation angles inferior to the half of a practical view angle in the range of 120° to 180° within horizontal plane, preferably 120° to 150° within horizontal plane, and 30° to 180° within vertical plane.

To achieve a sufficient contrast, the projector should have an output flux higher than 1000 Lumen, better higher than 3000, ideally between 2000 and 10'000. The best projector flux values have to be chosen depending on the environmental conditions.

The projection screen size can be big, depending by the projector brightness; position and screen gain and viewing angle. A typical image size, in operation of the system, is larger than 10", usually between 10" and 60", with preference between 30" and 50". The image size is measured as diagonal size in the unit inch as it is common within the field of screen technology.

As the available distance between the projector and the glazing, in the orthogonal direction to the glass surface (projection distance), is usually between 2 cm and 60 cm, preferably between 7 cm and 40 cm, a preferential option is to use a short-throw projector. The throw ratio (size of the image/distance between projector and screen) is usually larger for short-throw projectors. In a short-throw projector, there is often a folding optics so that the projector image can be displayed in a plane that is perpendicular to the output lens, which is particularly favorable for windshields as projection screens. In this case, the projector can be arranged near the motor edge of the windshield and still display an image on the windshield. The distance of the projector to the windshield, measured as orthogonal distance between the windshield and a projector housing being parallel to the windshield, is for example 11.7 cm with a resulting image size of 48 inch in diagonal.

The above-referenced generation of hot spots in the glazing unit can, to a certain extent, be suppressed by a suitable arrangement of the respective (inner and outer) surfaces of the glazing unit and, in particular, of the diffuse reflective sheet coating or surface, respectively. As an additional means for suppressing the hot spots at least one local blind can be arranged close to the output lens of the projector, in a suitably pre-defined position.

The image projected on the transparent screen is due to diffuse reflection. The reflection of a glazing is defined as diffuse reflection when incident radiation on the glazing with a given angle of incidence is reflected in a plurality of directions. Specular reflection occurs when incident radiation on the glazing with a given angle of incidence is reflected with an angle of reflection equal to the angle of incidence. Likewise, transmission is defined as specular when incident radiation with a given angle of incidence is transmitted with an angle of transmission equal to the angle of incidence. However, to keep transparency on the whole glazing, the inner face and outer face of the glazing are flat and therefore induce specular reflection from the projector beam. To achieve the experience, the light reaching the eye of the vehicle passengers should be given by the "diffuse reflection" of the projected image on the glass. The specular reflection on the inner and outer face of the glazing should be avoided. The specular reflection is also referred to as "hot-spot", which glares the observer when it is directed to the viewer. The direction of the hot-spot is available via the law of reflection saying that the angle of reflection equals the incidence angle. To avoid glaring the viewer by the hot-spot, the hot-spot and the observation direction of all passengers of the vehicle show preferably an angle distance of at least 5°, more preferably at least 10°, most preferably at least 20°.

The position and orientation of the projector disclosed in this invention, combined with the inclination of the windshield, is important to avoid the specular reflection to be directed toward the observers. In the case of most transparent screens the diffuse reflection cone will therefore not be centered on the observers, which make the large view angle another key point of this invention.

Regarding the configuration of the vehicle compound glazing unit, according to a first aspect of the invention, the glazing unit comprises an inner glass or plastic pane, an outer glass or plastic pane and a diffusely reflective plastic sheet laminated between the inner and outer glass or plastic panes.

In an embodiment of this aspect, the diffusely reflective sheet is an adhesive sheet or is embedded between two adhesive films or layers, for bonding the inner glass or plastic pane to the outer glass or plastic pane.

According to another aspect of the invention, the glazing unit comprises an inner glass or plastic pane, an outer glass or plastic pane and an adhesive film or layer for bonding the inner glass or plastic pane to the outer glass or plastic pane. Herein, the inner surface of the inner or outer glass or plastic pane, contacting the adhesive film or layer, respectively, comprises a diffusely reflective coating or is treated to make the surface a diffuse reflector, e.g. by use of textured glass. Hence, according to this aspect, no separate diffusely reflective sheet is laminated into the compound glazing unit, but the diffuse reflexivity is imposed unto one of the basic components of the glazing unit, i.e. on one of the glass (or plastic) panes.

In embodiments according to both aspects, the diffusely reflective plastic sheet or diffusely reflective coating of the coated glass or plastic pane comprises nanoparticles or microparticles within transparent substrate. More specifically, the nanoparticles or microparticles are silica or polymer or liquid crystal particles. Metal or metal oxide particles can also be used. More specifically, the nanoparticles or microparticles can have spherical shape and/or are transparent or translucent.

Plastic sheets with a diffusely reflective coating comprising titanium oxides $TiO_x$ particles or silver particles as well as plastic sheets with an organic diffusely reflective coating comprising cholesteric liquid crystals have turned out to be especially suitable for the screen applications according to the invention. Most preferably the diffusely reflective plastic sheet contains liquid crystal particles, which are oriented within a matrix.

Some examples on how the diffusively reflective plastic sheet could be formed are described in WO 2017/204103 A1, in which cholesteric liquid crystal dots are randomly dispersed on the substrate and covered by an index-matched layer. The cholesteric liquid crystal dots are formed as approximately half spheres, depending on the contact angle between dot and substrate. A wavelength selectivity can also be derived, as disclosed in WO 2016/175183 A1.

In another embodiment, one surface of the diffusely reflective plastic sheet comprises a random nanostructure or microstructure and, in particular, the other surface is polished.

Preferably the diffusely reflective plastic sheet comprises a polyethylene (PE), polyethylene terephthalate (PET), poly methyl methacrylate (PMMA), polyvinyl butyral (PVB), triacetyl cellulose (TAC) or polycarbonate sheet. Such sheets are basically commercially available or can be manufactured upon request of the manufacturer of the vehicle compound glazing unit, tailored to the specific optical requirements according to the invention.

In a particular preferable embodiment, the diffusive reflective plastic sheet is a rough plastic film, wherein several textured layers are contained and the screen properties can be adjusted by the slope of the contact surfaces between the neighboring textures layers. The transparency of the screen is thereby achieved within the lamination step of the windshield. Exemplary embodiments and texturation techniques are described in WO 2012/104547. Advantages of this solution are described as follows.

From a manufacturing point of view, less material is needed as the interlayer used for windshield lamination is responsible for the transparency and no specific planarization layer protected by a counter-film is needed.

Furthermore, with some texturation techniques (e.g. embossing), the random texture can be chosen so that the view angle is large enough. Even the random texture of the transparent screen has some statistical parameters (according to norm ISO 4287), wherein a good choice of these parameters, in particular of the mean square slope of textured layers, enables to tailor the intrinsic viewing angle.

Compared to solutions with particles embedded in a transparent matrix, the use of a rough plastic film with textured layers yields good values for clarity and haze on the one hand and gain on the other hand. With particle embedded solutions a compromise between those is always necessary. Concerning an index matching of the refractive indices of the sheets, the non-coated plastic sheet has to be taken into account. As described in WO 2012/104547, thin layers coated on a textured surface need to have different refractive indices to achieve reflective properties, but as long the outer layers (here plastic sheet and interlayer) have the same refractive index and all the textured interfaces are parallel, transparency is obtained.

Diffusive reflective plastic sheets have the advantage that they can be inserted only at the screen location and thus more easily tailored.

In an alternative embodiment, a rough glass sheet can be used instead of the rough plastic film. This has the advantage that a glass sheet can be integrated in standard lamination processes.

At least in embodiments, the system of the invention results in significant advantages which open a wide range of applications in future mobility concepts, including driver-driven or autonomous cars, buses, train or subway cars, boats, airplanes and aerocabs. Whereas in automobiles the windshield will be the most preferred glazing unit for displaying information, the system can also be implemented with side windows or roof glazing units, in particular in buses or train cars.

In the framework of such concepts, the users will require that a broad range of information be displayed to all of them (not only a driver) in a convenient and flexible way, and big size displays implemented by means of the invention will be highly attractive in this regard. On the other hand, the glazing which is used for the display of information is still fully transparent, and the projection of light to outside the vehicle—which might disturb persons outside or even be dangerous—can be directed outside the expected eye boxes of other road users.

The main application of the invention is to display contents on glass in a vehicle (also autonomous vehicles, buses, taxicabs, trains, tractors, airplanes). This can be used in both directions: to provide information (1) internally for the driver and vehicle passengers and also (2) externally for pedestrians, cyclists, bus & train passengers, others road users or for external users (for example when the car is in a show-room).

Regarding the purpose for vehicle passengers, the system can support the driver's awareness and attention in the traffic and help vehicle passengers gaining more confidence in the vehicle technology and the transportation.

Also we can think of an infotainment system integrated into the glass enabling for a mixed reality environment: this means that the occupant's eye will see the image of the outer environment combined with the image projected on the glazing. This is kind of "augmented-reality".

In the same way, safety information and advertisement can be shown on the glass panes. This can lead to a usage of the glazing surface of the vehicle as an advertisement surface, while maintaining transparency.

Some safety features can be introduced by this technology: the image being surprisingly visible from inside and outside the vehicle, some information can be displayed to inside or outside users, depending on the need. It is to be noted that such an image visible from outside the vehicle corresponds to diffuse light and therefore not glaring the other road users and thus not contradictory with inventions requirements.

Likewise, also external users can, therefore, benefit from the presented system. The awareness of the outside traffic participants can be enhanced, e.g. by displaying safety-supporting features (blinking lights etc.) on the windshield or side windows. This can increase confidence in autonomous vehicles for other road users or for the occupants.

In the context of public transport, we can think of information on routes, transport purpose, next stop, final destination on the windows of buses, trains, etc.

Also beyond the application in mobility, the technology can be used in building glass sector, projecting information to be seen from inside but also outside. It can be used e.g. to attract the attention of people for advertisement purpose (free room in hotel, menu in a restaurant, sales offer in a shop).

Likewise, it will be of huge interest for the advertisement industry regarding customer targeting and context enhancement.

The invention can be combined with other technologies as e.g. HUD, any specific coating, Smart-WS etc. It is possible to include this technology (transparent display in glazing) in other more complex system, for example integrating a camera for interaction with the vehicle occupants (e.g. skype call with call partner projected on glass).

In the following some preferred embodiments of the invention are described. The vehicle glazing and display system comprises a vehicle compound glazing unit comprising a layer or surface which diffusely reflects incident light directed to the glazing unit from the interior of the vehicle and having a maximum gain in the range of 0.1 to 0.8, preferably between 0.3 and 0.6 and a viewing angle for a real image element generated within the glazing plane of more than 60°, preferably more than 90° and more preferably of 120° or more, in a first direction and of more than 30°, preferably more than 45°, in a second direction, perpendicular to the first direction, and a projector for projecting an image to the vehicle glazing unit to generate a real image in the plane of the glazing unit.

Preferably, the glazing unit has atypical haze value in the range of 1% to 6%, preferably between 2.5% and 4.5%, and/or the reflective layer or surface within the glazing unit has a transmission of visible light of higher than 70%, preferably of 80% or more.

Preferably, the vehicle glazing and display system is adapted as a windshield head-up display, HUD, in a car, boat or airplane/aerocab.

Preferably, the projector is adapted to be arranged in a dashboard.

Preferably, at least one local blind is arranged close to the output lens of the projector, such that the generation of hot spots in the glazing plane of the glazing unit is avoided.

Preferably, the projector is adapted to provide an output flux of at least 1,000 Lumen, preferably of 3000 Lumen or more.

Preferably, the vehicle glazing and display system is adapted to generate, in its assembled state, a real image in the glazing plane with a horizontal extension of at least 25 cm, preferably between 40 cm and 60 cm.

Preferably, the glazing unit comprises an inner glass or plastic pane, an outer glass or plastic pane and a diffusely reflective plastic sheet laminated between the inner and outer glass or plastic panes.

Preferably, the diffusely reflective sheet is an adhesive sheet or is embedded between two adhesive films or layers, for bonding the inner glass or plastic pane to the outer glass or plastic pane.

Preferably, the glazing unit comprises an inner glass or plastic pane, an outer glass or plastic pane and an adhesive film or layer for bonding the inner glass or plastic pane to the outer glass or plastic pane, wherein the inner surface of the inner or outer glass or plastic pane, contacting the adhesive film or layer, respectively, comprises a diffusely reflective coating or is treated to make the surface a diffuse reflector.

Preferably, the diffusely reflective plastic sheet or diffusely reflective coating of the coated glass or plastic pane comprises nanoparticles or microparticles within transparent substrate.

Preferably, the nanoparticles or microparticles are silica or polymer or liquid crystal particles.

Preferably, the nanoparticles or microparticles have spherical shape and/or are transparent or translucent.

Preferably, one surface of the diffusely reflective plastic sheet comprises a random nanostructure or microstructure and, in particular, the other surface is polished.

Preferably, the diffusely reflective plastic sheet comprises a PE, PET, TAC, PVB, PMMA or polycarbonate sheet.

Embodiments and aspects of the invention are illustrated in the drawing. In the drawing shows FIG. 1 a schematic side view of a vehicle glazing and display system according to an embodiment of the invention, FIG. 2 an illustration for explaining definitions of the term "gain" in the context of the invention, FIGS. 3A and 3B schematic views of possible arrangements of the vehicle glazing and display system and for explaining hot spots, FIG. 4A-4C schematic cross-sectional illustrations of embodiments of vehicle compound glazing units, FIG. 5 schematic view of a windshield with a projector arrangement within a coordinate system depicting the geometrical constraints for all windshield applications of the invention and FIG. 6A-6B some configuration examples for windshields with projector arrangements.

FIG. 1 shows an exemplary arrangement of a vehicle glazing and display system 1 within a car 2, for projecting images onto a windshield 3 of the car by means of a projector 4 which is arranged within a dashboard 5. An image generated by the projector in the glazing plane is shown as a dotted line and designated with numeral 6.

In an exemplary geometrical configuration, the projector can be a commercially available short-throw lamp projector which has a brightness of 3500 Lumen and a contrast ratio of 13,000:1 and which is arranged inside the dashboard structure, wherein the output lens is at a distance x=26 cm below the uppers surface of the dashboard and at a distance y=36 cm from the lower edge of the windshield.

An exemplary structure of the windshield 3 is: 2.1 mm clear glass, thin PVB (0.38 mm), transparent diffuse reflective screen foil (0.045 mm), very thin PVB (0.05 mm), 2.1 mm green glass. Crucial optical parameters of the windshield are as follows:

Transparency: above 70% TL-A

Hazemeter measurement: light transmission 81.3%; haze 3.4% (measured according to norm ISO 14782); clarity 99.7% (measured with hazemeter HazeGuard Plus from Byk-Gardner)

Screen properties: The intrinsic viewing angle is 70° with a maximum gain of 0.27. In practice, a "usable" practical viewing angle of ca 170° can be observed in the horizontal plane (see previous definition of gain and viewing angle).

Possible variations of the illustrative embodiment are as follows:

The contents can be displayed on the windshield or side windows, on roofs, on back lites, and in general on all the other glazing present in a vehicle. Basically, the same aspects will be important as for windshield.

The projector can be integrated into the vehicle at different locations: For the use in the windshield the projector can be located for example in the dashboard or in the roofline. For the use in the side window the projector can be located for example below the armrest or in the roofline as well.

It is also possible to project the screen only on a part of the glass pane, using an optical element, directly controlling the light from the source (projector) or changing the projector features. In this case, if the image is not displayed in the A or B vision zone, some constraints on glazing transmission can be released and the invention can include the use of a darker interlayer foil or any darker element that would help to increase the contrast by lowering the transmission while keeping transparency.

The required brightness and flux of light to be sent by the projector varies, depending on the projection direction.

In case the system has to be integrated in an existing car, due to packaging and space constraints, it is sometimes impossible to avoid hot-spot, and therefore it is needed to recur to other methods to avoid the hot-spot for the passengers.

As the hotspot is caused by the specular reflection of the light projected by the projector and reaching the eyes of the driver, one way to eliminate the hot-spot, is to interfere in some light rays come from the projector, for example placing an opaque, non-reflecting obstacle, which partially reduces or traps the projected surface on the glass. The hotspot can also be avoided by reducing the image size, so that the angular area where the observer can hit a specular reflection is reduced.

In an embodiment, the elimination of the hot-spot is performed identifying the hot-spot positions for all the occupants, and then placing a non-reflecting optical surface (piece of dark paper or of dark material) between the projector and the portion of the windshield where the hotspot is appearing.

FIG. 2 shows diagrams for explaining the important parameter "gain" with respect to a screen, e.g. the windshield 3 in FIG. 1, referring to the explanations further above. The gain measurements were carried out using a luminance meter, and a video projector. The luminance is measured at various observation angles for a given incidence angle of the projected light. The projection angle was set as close as possible to 0° (normal to the screen). When the projection angle is held fixed, the gain depends only on the observation angle θ. The luminance meter position is consequently adjusted so that when the observation angle is set to 0° in the horizontal plane, the luminance meter is aligned with specular reflection; the observation angle is therefore really equal to 0° as the specular direction is taken as the reference for observation angle measurement. Luminance measurements were carried out every five degrees 5° to 75° (measured in the horizontal plane) in an unlit environment isolated from any light source other than the video projector. A Spectralon measured under the same conditions was used to standardize the luminance measurements and to extract the gain therefrom. The intrinsic viewing angle α can be derived from these measurements as the full width half maximum of the gain curve and depicts the angular width for which the gain is superior to half the peak gain.

Figure 3A:
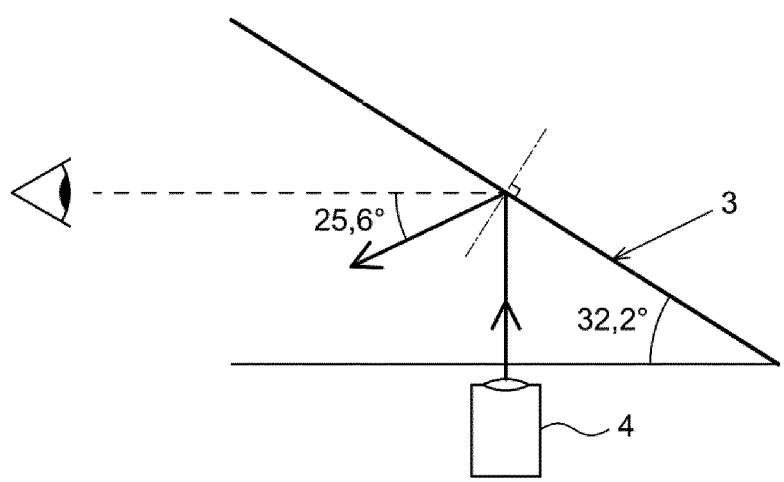
Figure 3B:
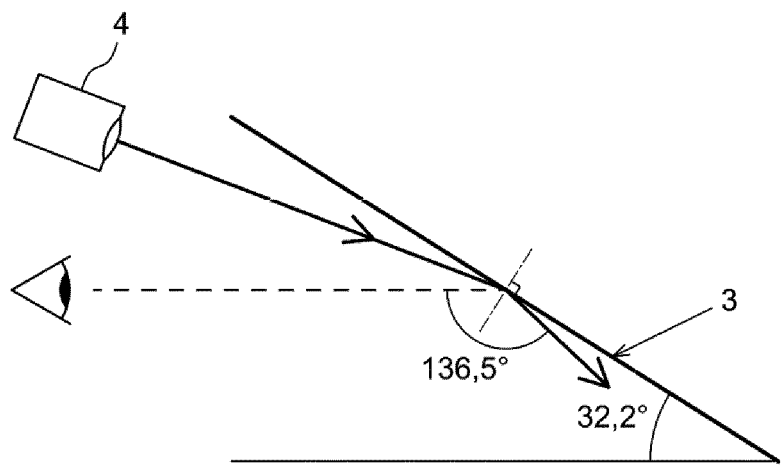

As shown in FIG. 3A, the projector is placed e.g. in the dashboard, so that it emits vertically towards the ceiling. This is a preferred position, because the observation angle is lower. Alternatively, as shown in FIG. 3B, the projector is arranged in the ceiling, projecting in the direction of the car bonnet. With these two positions and orientations of the projector, no emitted light is directed towards the road.

The image projected on the transparent screen is due to diffuse reflection. However, to keep transparency on the whole glazing, the inner face (face 4) and outer face (face 1) of the glazing are smooth and therefore induce specular reflection from the projector beam. In this context a smooth surface is a surface without 3-dimensional structuring. Of course, the outer pane and the inner pane show a 3-dimensional bending as typical for windshields. To achieve the experience, the light reaching the eye of the vehicle passengers should be given by the "diffuse reflection" of the projected image on the glass and the specular reflection (on the inner (face 4) and outer (face 1) face of the glazing) should be avoided. Depending on the embodiment of the transparent screen, the inner faces of the glazing (face 2 and face 3) can be textured or smooth, wherein smooth surfaces induce specular reflection and structured surfaces lead to diffuse reflection (see embodiments of FIGS. 4A, 4B and 4C).

The position and orientation of the projector disclosed in this invention, combined with the inclination of the windshield, is important to avoid the specular reflection to be directed toward the observers. In the case of most transparent screens the diffuse reflection cone will therefore not be centered on the observers, which make the large viewing angle another key point of this invention.

FIGS. 3A and 3B show two possible arrangements of the projector 4 relative to the windshield 3, as already explained further above. It can be recognized that in the arrangement of FIG. 3A, where the projector is arranged below the windshield and emits its light in a vertical direction, the hot spot direction can be within the angle of view of passengers inside the vehicle, whereas this is almost excluded in the arrangement of FIG. 3B, where the projector is arranged below the roof of the vehicle. For the arrangement of FIG. 3A it may, therefore, be required to provide specific means for "masking" the hot-spots, as also mentioned further above. If there are no geometric constrains in integration of the projector to the dashboard, this "masking" is not needed as the geometry of projector and screen will be chosen in a way that the hot-spot is not directed towards the viewer. A masking can be avoided if over the whole picture, the angle β is comprised between −110.6° and 0°. Corresponding position and image size depends on the projector throw ratio and/or geometry. The arrangement of FIG. 3A is preferred as the viewing angle and gain are within the specification according to FIG. 2 (gain/2 equivalent to α/2) and thus the contrast of the image is better. The embodiment of FIG. 3B is operating within a region of smaller gain (flat section of curve in FIG. 2), which means that a higher luminance is needed.

FIG. 4A-4C show exemplary embodiments of the vehicle compound glazing unit (or: laminated glazing unit) according to the invention.

FIG. 4A shows a glazing unit 10 which basically has a conventional structure, i.e. consists of an inner glass pane 11 and an outer glass pane 12 which are bonded together by means of a thermoplastic interlayer 13, preferably a thin PVB sheet. The outer glass pane 12 comprises an outer surface (also denoted as face I) and an inner surface (also denoted as face II). The inner glass pane 11 also comprises an inner surface (face III) and an outer surface (face IV). The inner surface (face II) of the outer glass pane 12 and the inner surface (face III) of the inner glass pane 11 are bonded The inner surface 12a (face II) of the outer glass pane 12 comprises a random nanostructure or microstructure, respectively, which is adapted to provide an angle of view and a sufficient diffuse reflection according to the specifications of the invention, at the same time maintaining a sufficiently high transmission. The structured inner surface 12a is provided with a thin reflective coating (not shown). To achieve a high transparency of the glazing an index-matching of the refractive indices between glass and interlayer is necessary. These two dielectric materials should have substantially the same refractive index, or their refractive indices should be substantially equal, which is defined as the absolute value of the difference between their refractive indices at 550 nm being less than or equal to 0.15. Preferably the absolute value of the difference in refractive index at 550 nm between the constituent materials of the two layers is less than 0.05, more preferably less than 0.015. This applies not only for the specific embodiment of FIG. 4a with PVB as interlayer and a structured glass surface as diffusive layer, but also to other embodiments analog to this.

FIG. 4B shows a glazing unit 10' which, corresponding to a conventional laminated glazing unit, comprises an inner glass pane 11 and an outer glass pane 12 and an intermediate layer bonding the glass panes 11, 12 together. However, different from the arrangement of FIG. 4A, the intermediate layer 13 is a multilayer comprising a first thermoplastic interlayer 13.1, preferably a PVB sheet, and a second thermoplastic interlayer 13.2, preferably a PVB sheet and, embedded between the two thermoplastic interlayers (PVB sheets), e.g. a diffusely reflective sheet 14 of PET or PMMA.

The reflectivity of the sheet 14 is due to transparent or semi-transparent nanoparticles or microparticles which are randomly distributed in the material of the sheet. These can e.g. be silica or glass beads or polymer or liquid crystal particles. In a modified embodiment, the sheet 14 can be a clear sheet but have one of its surfaces provided with a nanostructure or microstructure, similar to the surface 12a of the outer glass pane 12 in FIG. 4A and is also, as mentioned for surface 12a coated with a thin reflective coating.

FIG. 4C shows a further exemplary laminated glazing unit 10'', comprising an inner glass pane 11 and an outer glass 12 laminated to each other by means of a thin PVB sheet as thermoplastic interlayer 13. In this example, the inner surface 12a of the outer glass pane 12 has a diffusely reflective coating 12b. Such coating can contain nanoparticles or microparticles, as mentioned above with respect to FIG. 4B in a clear matrix.

Within FIG. 5 the relationship between windshield inclination, projection direction and observation angle is depicted. The principals of FIG. 5 are not limited to any specific embodiment of the invention, but apply in general. A windshield 3 is oriented within a coordinate system, wherein the reference point is set at the motor edge of the windshield 3. The windshield 3 is illuminated by a projector 4 with coordinates Xp and Yp, wherein an image 6 is with coordinates Xi and Yi is obtained. The image 6 is viewed by an observer within the position Xo, Yo. Several angles are noted to characterize the arrangement of projector and windshield. These angles are oriented angles, which can be positive or negative (positive with respect to trigonometric convention) and are expressed in degrees. When measured with respect to horizontal direction, angles are measured towards the horizontal direction.

The following angles are defined:

δ: inclination of windshield, measured as angle from windshield to horizontal.

The inclination of the windshield is preferably between 20° and 60°, more preferably between 25° and 50°, most preferably between 25° and 35°, for example 32.2°.

β: angle from projection direction to horizontal.

The angle β is measured inside the triangle formed by the projection direction, the horizontal and the windshield and its absolute value might therefore be greater than 90°.

γ: angle from observation direction to horizontal

θ: observation angle, measured as angle from specular reflection to observation direction. For the observation angle θ only the absolute value is essential.

α: intrinsic viewing angle of the screen, non oriented. The practical viewing angle α' would be represented in the same way, wherein the value of intrinsic viewing angle and practical viewing angle differ.

The observation angle θ can be derived by the equation $\theta = 2\delta - \beta - \gamma - 180°$.

According to the invention the absolute value $|\theta|$ has to be greater than 5° and smaller than $\alpha/2$ to achieve good viewing results.

For a certain projector position with coordinates Xp, Yp the angle β can be derived as follows, wherein the applicable equation has to be chosen in dependency of the coordinates Xi, Yi of the image:

If Xp>Xi applies, the absolute value of angle β is $|\beta|<90°$ and β is derived by $\beta = \arctan((Yp-Yi)/(Xp-Xi))$ If Xp<Xi applies, the absolute value of angle β is $|\beta|>90°$ and β is derived by $\beta = -180 + \arctan((Yp-Yi)/(Xp-Xi))$ for Yp<Yi.

Theoretically, for the case Xp<Xi and Yp>Yi the angle β can be expressed by $\beta = 180 + \arctan((Yp-Yi)/(Xp-Xi))$, wherein this case is not to expected in practice.

For investigation of a whole image, the described conditions for θ should be verified for all points of the displayed image. In practice, this means that a value for θ at the upper and lower positions of the picture, denoted as $\theta_{up}$ and $\theta_{low}$, is calculated and the sign of $\theta_{up}$ and $\theta_{low}$ should be the same and both should comply with the condition $5° < |\theta| < \alpha/2$.

Figure 6A:
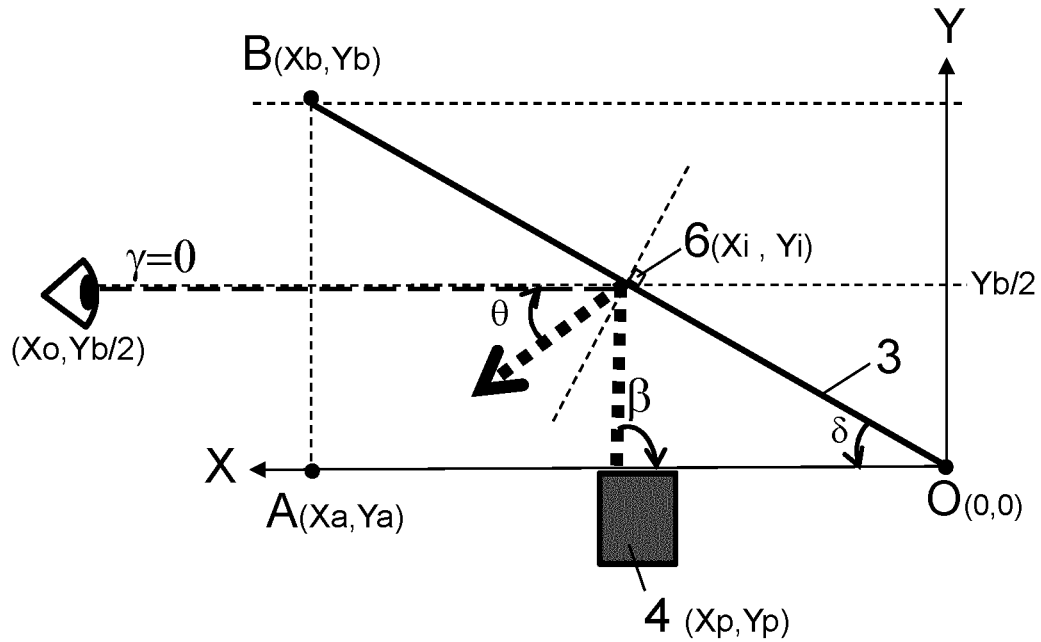
Figure 6B:
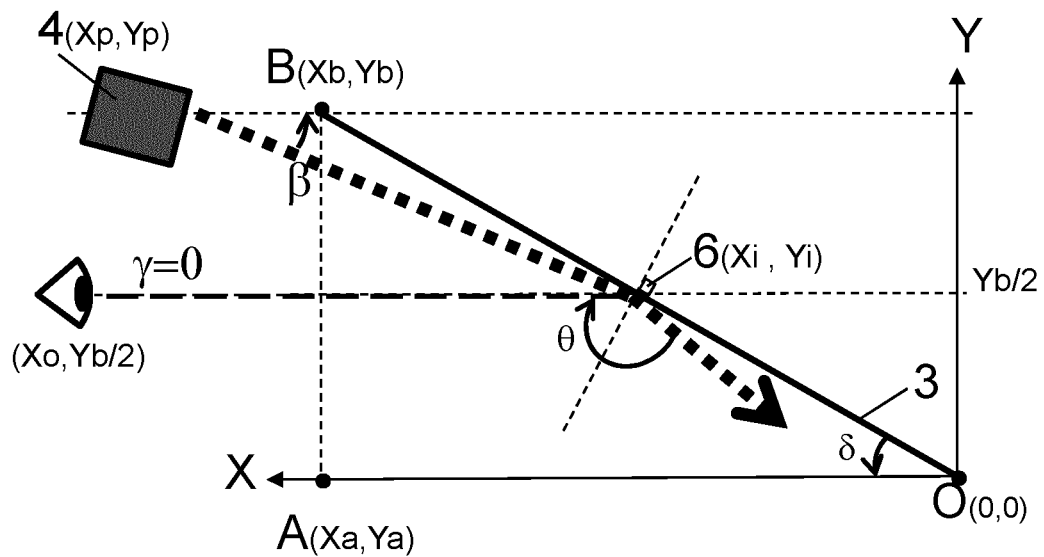

FIGS. 6A and 6B show some exemplary configurations of a windshield with projector, wherein the notations described in FIG. 5 apply.

REFERENCE NUMERALS

1 Vehicle glazing and display system
2 Vehicle
3 Windshield
4 Projector
5 Dashboard
6 Image on glazing unit
10; 10'; 10" Vehicle compound glazing unit
11 Inner glass pane
12 Outer glass pane
12a Inner surface of outer glass pane
12b Coating on outer glass pane
13; 13.1, 13.2 thermoplastic interlayers, preferably PVB sheets
14 Diffuse reflective sheet
x Distance from projector to dashboard upper surface
y Distance between output lens of projector and lower edge of windshield

The invention claimed is:

1. A vehicle glazing and display system comprising a vehicle compound glazing unit comprising a layer or surface which diffusely reflects incident light directed to the vehicle compound glazing unit from an interior of the vehicle and having a maximum gain in diffuse reflection in the range of 0.3 to 0.8, the gain corresponding to a ratio between a luminance of the layer or surface and a luminance of a Lambertian diffuser, as measured when illuminated with a normal incidence, and an intrinsic viewing angle α for a real image element generated within a glazing plane of more than 120°, in a first direction and of more than 30°, in a second direction, perpendicular to the first direction, and
a projector for projecting an image to the vehicle compound glazing unit to generate a real image in the glazing plane of the vehicle compound glazing unit and wherein the vehicle compound glazing unit is a windshield.

2. The vehicle glazing and display system of claim 1, wherein the vehicle compound glazing unit has a typical haze value in the range of 1% to 6% and/or the reflective layer or surface within the glazing unit has a transmission of visible light of higher than 70%.

3. The vehicle glazing and display system of claim 2, wherein the haze value is in the range of 2.5% to 4.5% and the transmission of visible light is higher than 80%.

4. The vehicle glazing and display system of claim 1, wherein the projector is adapted to be arranged in a dashboard.

5. The vehicle glazing and display system of claim 1, wherein a projection distance given as orthogonal direction to the windshield, is between 2 cm and 60 cm.

6. The vehicle glazing and display system of claim 1, wherein at least one local blind is arranged close to the output lens of the projector, such that a generation of hot spots in the glazing plane of the glazing unit is avoided.

7. The vehicle glazing and display system of claim 1, wherein the projector is adapted to provide an output flux of at least 1,000 Lumen.

8. The vehicle glazing and display system of claim 7, wherein the output flux is of at least 3,000 Lumen.

9. The vehicle glazing and display system of claim 1, adapted to generate, in its assembled state, a real image in the glazing plane with a horizontal extension of at least 25 cm.

10. The vehicle glazing and display system of claim 9, wherein the horizontal extension is between 40 cm and 60 cm.

11. A vehicle compound glazing unit of a vehicle glazing and display system of claim 1, the vehicle compound glazing unit comprising an inner glass or plastic pane, an outer glass or plastic pane and a diffusely reflective plastic sheet laminated between the inner and outer glass or plastic panes.

12. The vehicle compound glazing unit of claim 11, wherein the diffusely reflective sheet is an adhesive sheet or is embedded between two adhesive films or layers, for bonding the inner glass or plastic pane to the outer glass or plastic pane.

13. The vehicle compound glazing unit of claim 11, wherein the diffusely reflective plastic sheet or diffusely reflective coating of the coated glass or plastic pane comprises nanoparticles or microparticles within transparent substrate.

14. The vehicle compound glazing unit of claim 13, wherein the nanoparticles or microparticles are silica or polymer or liquid crystal particles.

15. The vehicle compound glazing unit of claim 13, wherein the nanoparticles or microparticles have spherical shape and/or are transparent or translucent.

16. The vehicle compound glazing unit of claim 11, wherein one surface of the diffusely reflective plastic sheet comprises a random nanostructure or microstructure.

17. The vehicle compound glazing unit of claim 16, wherein another surface of the diffusely reflective plastic sheet is polished.

18. The vehicle compound glazing unit of claim 11, wherein the diffusely reflective plastic sheet comprises a polyethylene (PE), polyethylene terephthalate (PET), tri-acetyl cellulose (TAC), polyvinyl butyral (PVB), poly methyl methacrylate (PMMA) or polycarbonate sheet.

19. A vehicle compound glazing unit of a vehicle glazing and display system of claim 1, the vehicle compound glazing unit comprising an inner glass or plastic pane, an outer glass or plastic pane and an adhesive film or layer for bonding the inner glass or plastic pane to the outer glass or plastic pane, wherein the inner surface of the inner or outer glass or plastic pane, contacting the adhesive film or layer, respectively, comprises a diffusely reflective coating or is treated to make the surface a diffuse reflector.

20. The vehicle glazing and display system of claim 1, wherein the maximum gain is in the range of 0.3 to 0.6.

21. The vehicle glazing and display system of claim 1, wherein an absolute value of an observation angle measured as angle from specular reflection to observation direction is greater than 5° and smaller than $\alpha/2$.

* * * * *